Figure 1:
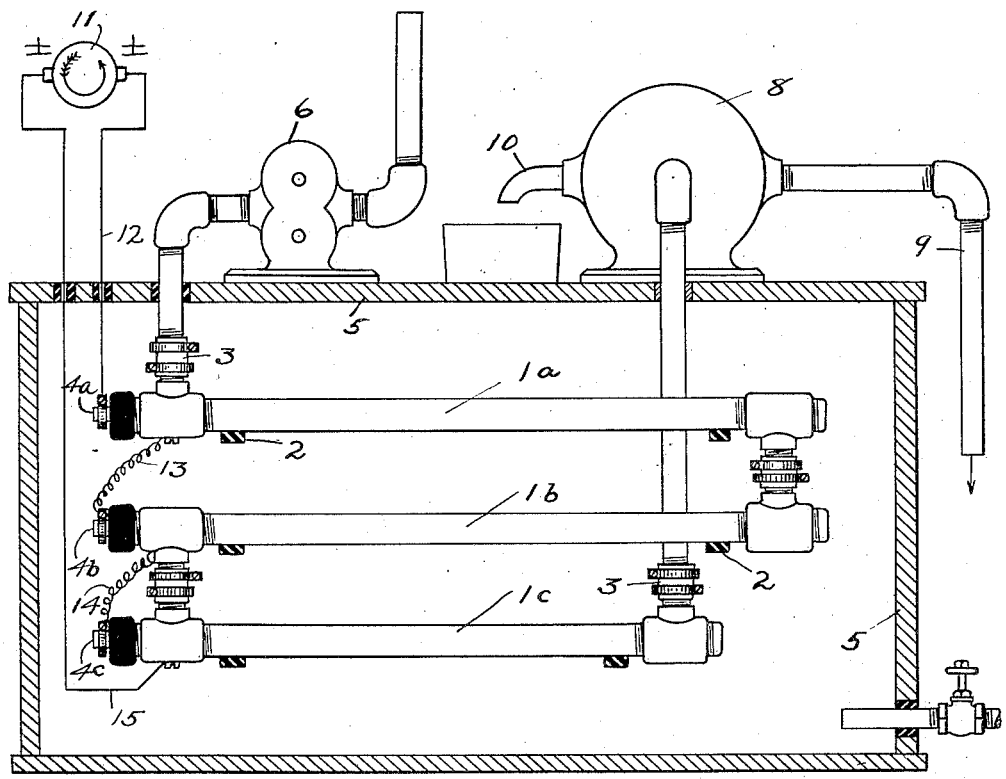

G. D. ROGERS.
PROCESS OF EXTRACTING OILS FROM FATTY SUBSTANCES.
APPLICATION FILED MAR. 7, 1919.

1,326,968.

Patented Jan. 6, 1920.

Inventor:
George D. Rogers,
by Nathan B. Day,
Attorney

UNITED STATES PATENT OFFICE.

GEORGE D. ROGERS, OF GLOUCESTER, MASSACHUSETTS.

PROCESS OF EXTRACTING OILS FROM FATTY SUBSTANCES.

1,326,968.  Specification of Letters Patent.  Patented Jan. 6, 1920.

Application filed March 7, 1919. Serial No. 281,204.

*To all whom it may concern:*

Be it known that I, GEORGE D. ROGERS, a citizen of the United States, residing at Gloucester, in the county of Essex and State of Massachusetts, have invented certain new and useful Improvements in Processes of Extracting Oils from Fatty Substances, of which the following is a specification.

This invention relates to an improved process for the treatment of fatty substances or other organic matter for the purpose of deriving the fats or oils therein originally contained; and more especially it relates to those processes which utilize the action of an electric current arranged to traverse said fatty substances and to break down the cell structures containing the fats or oils; and which in that manner, or by some other process of disintegrating or disorganizing the cell structures of said substances, operate to liberate and set free the fats or oil therein contained.

My invention is more especially employed for the purpose of extracting oil from fish livers or bodies, and as it finds its more particular application in the manufacture of cod oil or of cod liver oil I will herein describe more specifically the application of my improved process in relation thereto. I do not, however, intend that it shall be in any way limited to a field of operations of such narrow range.

While an electric current has been applied in the prior art to effect the extraction of oils from fatty substances by being caused to traverse the same, I am not aware of any such application which employs the step of rendering said mass of fatty substances of electrolytic character prior to treatment by the addition of an electrolyte of saline character, or in which said substances are treated while in a state of motion during such process; or further of any application as aforesaid in which said substances are treated other than in successive batches, one batch being treated in the apparatus, and after treatment being removed and a new batch substituted.

The object of my invention is to provide a process involving steps by which the fatty substances are first rendered flowable and of a definite electrolytic character, and the further step of handling the same in such manner that the said substances are subjected to the action of the electric current while they are in motion between the electrodes between which said electric energy is arranged to discharge.

For the purpose of applying my process, and more particularly in respect of the manner of handling said fatty substances and subjecting them to the discharge of electric energy, I employ the apparatus which is illustrated in the drawings.

Referring to said drawing Figure 1 is a general view in side elevation and partly in section showing the invention.

Figure 2:
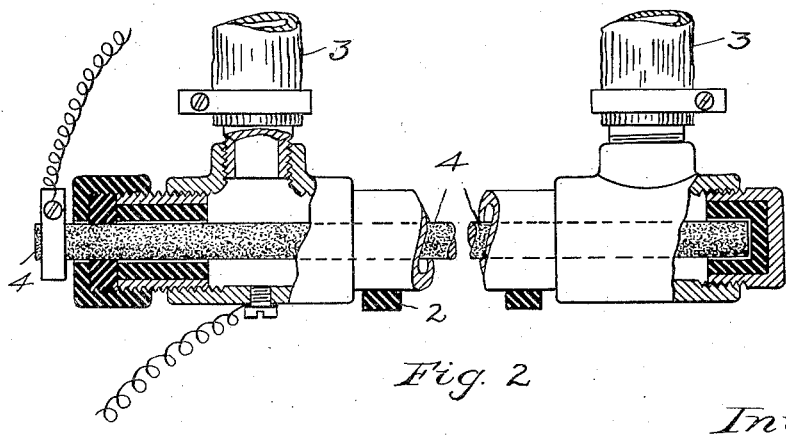

Fig. 2 is a view on an enlarged scale showing in elevation two adjacent pipes of my apparatus, and illustrating certain details in the mechanical and electrical arrangement of the same.

Referring to the drawings, $1^a$, $1^b$, $1^c$, are successive pipes or cells which go to make up a coil within which the fatty substances are subjected to necessary electrical discharge. The shell or walls of said cells are electrically conductive and the successive cells are electrically insulated with respect to each other; each cell resting on insulating supports, 2, and being interconnected by means of short lengths of flexible hose, 3, or some other similar material having electrically insulating qualities.

Located substantially axially within each cell of the coil and extending longitudinally of the same is an electrically conductive electrode, 4, which is preferably in the form of a carbon rod. The said electrode or carbon rod, 4, is mounted within said cell or pipe in such manner as to be electrically insulated with respect thereto, and preferably so as to leave an annular space intermediate said rod and the shell of the cell.

Preferably the said coil is contained within a box, 5, within which it may be surrounded by steam for the purpose of maintaining the same at the desired temperature. A pump, 6, is arranged for forcing the fatty substances, which have previously been rendered flowable by comminuting, and also of an electrolytic character, from a storage receptacle, not shown in the figures, through the successively connected cells, $1^a$, $1^b$, $1^c$, of the coil. On emergence from the last cell, $1^c$, of the coil, said fatty substances are conducted to a separator, 8, preferably of the centrifugal type, by which a separation of the oil from the residue or waste is effected; the former being drawn off through the pipe, 9, into any suitable storage receptacle, not shown in the drawings, while the residue is discharged through the pipe, 10.

The successive cells, 1ª, 1ᵇ, 1ᶜ, of the coil are connected together preferably in series relation with each other, and with respect to a generator or other source of electricity, conventionally represented by 11; the connecting wires being arranged as follows: A wire, 12, leads through the top of the box, 5, to an end of the electrode rod, 4ª, which projects from the first cell, 1ª, of the coil. The wall of said cell, 1ª, is in turn connected by the wire, 13, to the rod end, 4ᵇ, of the second cell 1ᵇ. In like manner the wall of the latter cell is connected by the wire, 14, leading to the rod end, 4ᶜ, of the third cell, 2ᶜ. From the wall of the third cell, 2ᶜ, the wire, 15, returns to the other terminal of the source of electricity, 11; and the same method of further connection being employed in case the coil comprises a larger number of cells than is illustrated in the figure.

In the carrying out of my process for producing cod liver oil the said livers are ground up or comminuted by any convenient apparatus to such a degree of fineness or fluidity that they can be readily forced by the pump through the length of the coil, and in case of need sufficient fluid is added to insure that said mass of livers will be sufficiently flowable. While in many cases the said livers by nature contain enough salty constituents to render said comminuted mass sufficiently saline to possess electrolytic qualities in the necessary degree, if said mass is found to be lacking in such qualities, salt or other chemicals of a saline nature are mingled therewith until the said requisite degree of electrolytic character is produced.

As said substances are forced through said coil they occupy in each cell the annular space between the wall of the pipe which serves as one electrode and the carbon rod extending longitudinally of the cell in its center, the progressive movement of such substances from the intake end to the discharge end involves such continued motion of said substances with respect to the surfaces of said electrodes, and attendant agitation thereof as to insure continual changes in said substances which are in contact with the electrode surfaces and the stirring of said substances between said electrodes, resulting in a more thorough subjection of the different portions of said substances to the action of the electric current than in previous processes, and by reason of which a high degree of efficiency in the conduct of the process is attained. The result of the foregoing treatment is that when the said substance emerges from the coil the cell structure of the same is very thoroughly broken down, the liberated oils and the waste or residue of the fatty substances existing in an emulsive or mingled form, which may be readily separated by any of the well known mechanical apparatus designed for that purpose, into its separate constituents, oil and residuary or waste matter.

I claim as my invention:

1. A process for the extraction of oils from the fatty substances originally containing the same, which consists of causing said mass of fatty substances to flow between electrodes of opposite polarity, and of causing electrical energy to discharge from one electrode to the other through said mass as it flows between the same.

2. A process for effecting the liberating of oil from the livers or bodies of cod, or other fish, which consists in converting the same into a flowable mass, of causing said mass to flow between electrodes of opposite polarity extending longitudinally of the direction of flow, and of subjecting said mass to electric energy discharging from one said electrode to the other and traversing said mass as it flows between said electrode.

3. A process for the extraction of the oils from the fatty substances originally containing the same, which consists in converting said fatty substances into a comminuted mass having an electrolytic character, of conducting same through a conduit of relatively small area as compared with its length, and in causing electric energy to traverse said mass during its passage through conduit between electrode surfaces of opposite polarity arranged longitudinally of the conduit.

4. A process for the extraction of oils from the fatty substances originally containing the same, which consists in mingling said substances with a saline electrolyte, and of thereafter causing electric energy to be discharged thereto between electrodes of opposite polarity located in said mass.

5. A process for the extraction of oils from the fatty substances originally containing same, which consists in reducing said substances to a comminuted mass, in mingling therewith material of a saline nature in a sufficient amount to render said mass electrolytic, and thereafter causing said mass to pass between electrodes of opposite polarity in the presence of electric current flowing therebetween.

6. The process for the extraction of the oils from the fatty substances originally containing same, which consists in comminuting said fatty substances, mingling the same with a saline electrolyte, causing the said substances to traverse a conduit provided with electrodes of opposite polarity extending longitudinally thereof, and subjecting said substances during such passage to an electric current, discharging between said electrodes through said substances.

7. The process for liberating oils from the fatty substances originally containing same, which consists in comminuting said fatty substances, mingling the same with a saline electrolyte, causing the said comminuted substances to traverse a conduit provided with electrodes of opposite polarity extending longitudinally thereof, and subjecting said substances during such passage to an electric current discharging between said electrodes through said substances, and of thereafter causing said substances to be passed through a device for effecting the separation of said liberated oil from the residue of said fatty substances.

In testimony whereof I have affixed my signature, in presence of two witnesses.

GEORGE D. ROGERS.

Witnesses:
  WALTER C. KING,
  NATHAN B. DAY.